United States Patent
Wang et al.

(10) Patent No.: US 10,063,490 B2
(45) Date of Patent: Aug. 28, 2018

(54) METHOD AND SYSTEM OF OPERATING AN ONLINE APPLICATION SERVICE IN A DEPLOYMENT ENVIRONMENT TO FACILITATE RUN-TIME EXPERIMENTATION WITH USER INTERFACE CONFIGURATIONS

(71) Applicant: Microsoft Corporation, Redmond, WA (US)

(72) Inventors: Fang Wang, Redmond, WA (US); Albert Chik Shi Shen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/214,635

(22) Filed: Mar. 14, 2014

(65) Prior Publication Data
US 2015/0263981 A1 Sep. 17, 2015

(51) Int. Cl.
G06F 13/00 (2006.01)
H04L 12/911 (2013.01)
H04L 12/24 (2006.01)
G06F 8/71 (2018.01)
G06F 9/451 (2018.01)
G06F 9/445 (2018.01)

(52) U.S. Cl.
CPC .............. *H04L 47/70* (2013.01); *G06F 8/71* (2013.01); *G06F 9/451* (2018.02); *H04L 41/0803* (2013.01); *G06F 9/44505* (2013.01)

(58) Field of Classification Search
CPC .............. H04L 29/06; H04L 29/08072; H04L 29/08981; H04L 41/0806; H04L 41/12; H04L 47/70; G06F 7/48; G06F 7/49963; G06F 8/71; G06F 9/451; G06F 9/44505; G05B 13/0275; G06N 7/043; G06N 7/04
USPC .......................................... 709/220; 706/47
See application file for complete search history.

(56) References Cited

U.S. PATENT DOCUMENTS

| | | | |
|---|---|---|---|
| 7,353,234 B2 * | 4/2008 | Kimball | G06F 3/0481 |
| 8,261,231 B1 | 9/2012 | Hirsch et al. | |
| 2004/0181779 A1 | 9/2004 | Gorti | |

(Continued)

OTHER PUBLICATIONS

"International Search Report and Written Opinion Issued in PCT Application No. PCT/US2015/019809", dated May 18, 2015, 13 Pages.

(Continued)

*Primary Examiner* — Robert B Harrell

(57) ABSTRACT

Disclosed herein are systems, methods, and software for implementing runtime experiments with user interface configurations. In at least one implementation, an online application service receives access requests associated with various client applications attempting to access the online application service. In response to the access requests, the online application service communicates with an experiment control service to identify an experimental configuration in accordance with which to present a user interface to the online application service. The experiment control service selects the experimental configuration from various experimental configurations. The user interface is then presented in accordance with the experimental configuration identified for each of the client applications.

20 Claims, 8 Drawing Sheets

(56) References Cited

U.S. PATENT DOCUMENTS

2010/0125541 A1* 5/2010 Wendel ............... G06F 9/4443
                                                      706/47
2013/0174126 A1   7/2013 Belihomji et al.
2013/0179858 A1   7/2013 Mecke et al.

OTHER PUBLICATIONS

Starov, et al., "Integrated TaaS Platform for Mobile Development: Architecture Solutions", In Proceeding of the 8th International Workshop on Automation of Software Test, May 18, 2013, 7 pages.
Etherington, Darrell, "iOS App Beta Testing Takes With TestFlight", Published on: Jan. 21, 2011, Available at: http://gigaom.com/2011/01/21/ios-app-beta-testing-takes-with-testflight/.
Fulcher, et al., "Testing, Promoting, and Launching a Mobile Application as an Extension Tool: A Case Study with IPMPro", Published on: Aug. 2013.
Deng, et al., "DAnCE: A QoS-Enabled Component Deployment and Configuration Engine", In Proceedings of the Third International Working Conference on Component Deployment, Nov. 28, 2005, 15 pages.
Morin, et al., "An Aspect-Oriented and Model-Driven Approach for Managing Dynamic Variability", In Proceedings of the 11th International Conference on Model Driven Engineering Languages and Systems, Sep. 28, 2008, 15 pages.
Pitzer, et al., "PR2 Remote Lab: An Environment for Remote Development and Experimentation", In Proceedings of the IEEE International Conference on Robotics and Automation, May 14, 2012, 6 pages.
"International Preliminary Report on Patentability Issued in PCT Application No. PCT/US2015/019809", dated Mar. 23, 2016, 8 Pages.
"Second Written Opinion Issued in PCT Application No. PCT/US2015/019809", dated Jan. 5, 2016, 6 Pages.

* cited by examiner

METHOD AND SYSTEM OF OPERATING AN ONLINE APPLICATION SERVICE IN A DEPLOYMENT ENVIRONMENT TO FACILITATE RUN-TIME EXPERIMENTATION WITH USER INTERFACE CONFIGURATIONS

TECHNICAL FIELD

Aspects of the disclosure are related to computing hardware and software technology, and in particular, to experimenting with user interface configurations.

TECHNICAL BACKGROUND

In the field of computing hardware and software technology, users access and engage with a variety of online services with increasing regularity. Familiar examples of online services include, but are not limited to, email, social networking, media consumption, word processing, gaming, and file storage services. A typical online service runs in a data center or within the context of some other compute resource. A local client application exchanges information with the online service over a network or networks to facilitate what a user may experience as the features and functionality of the service.

At least some of the information exchanged between an online service and a client application includes the objects, data, images, components, and other interface elements with which a user interface to the online service may be rendered. The client application, usually with the cooperation of other applications or modules executing locally, processes the interface elements in order to present a coherent user interface with which a user may interact to enjoy the features and functions of the service.

The look and feel of a user interface, and even which features and functions are experienced in the user interface, is largely governed by how a service is implemented during the build and deployment stages of service provisioning. Many online services, especially those that operate at scale, utilize many developers to create the underlying program code for an online service. The developers generate the code which is then submitted to a build environment to be compiled and integrated into a form that can be installed in a deployment environment. The configuration of a user interface is thus set at the time its associated code is submitted to a build environment.

However, experimenting with different configurations for a user interface can be beneficial for developers. In order to accomplish such experimentation, various configurations of the user interface are coded during development and submitted to a build environment. In addition, parameters for an associated experiment are also coded and submitted to the build environment. The resulting version of the service that is ultimately deployed in the deployment environment thus includes the differing configurations of the user interface and the associated experimental parameters. At run-time, an experiment can be conducted whereby the various user interface configurations are served to end users per the experimental parameters established at build-time.

In an example, two different user interface configurations may be coded by developers and submitted to a build environment, along with experiment parameters indicating that the first configuration of the two is to be served to a quarter of all users while the other configuration is to be served to the remaining three-quarters of all users. The user interface configurations and experiment parameters will then be processed in the build environment and loaded into the deployment environment. Subsequent users will experience the two configurations in accordance with the experiment parameters.

In order to change the experiment, a new build of the service must be produced in the build environment and then provisioned in the deployment environment. In order to change even just the ratio of users served one or the other of the two configurations in the example above, a new instance of the service with the new experiment parameters would have to be submitted to the build environment and then deployed. In some cases there may be configurations that were built and deployed but that are not in use generally, nor are in use with respect to an experiment.

SUMMARY

Provided herein are systems, methods, and software for implementing runtime experiments with user interface configurations. In at least one implementation, an online application service receives access requests associated with various client applications attempting to access the online application service. In response to the access requests, the online application service communicates with an experiment control service to identify an experimental configuration in accordance with which to configure a user interface to the online application service. The experiment control service selects the experimental configuration from various experimental configurations. The user interface is then presented in accordance with the experimental configuration identified for each of the client applications.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
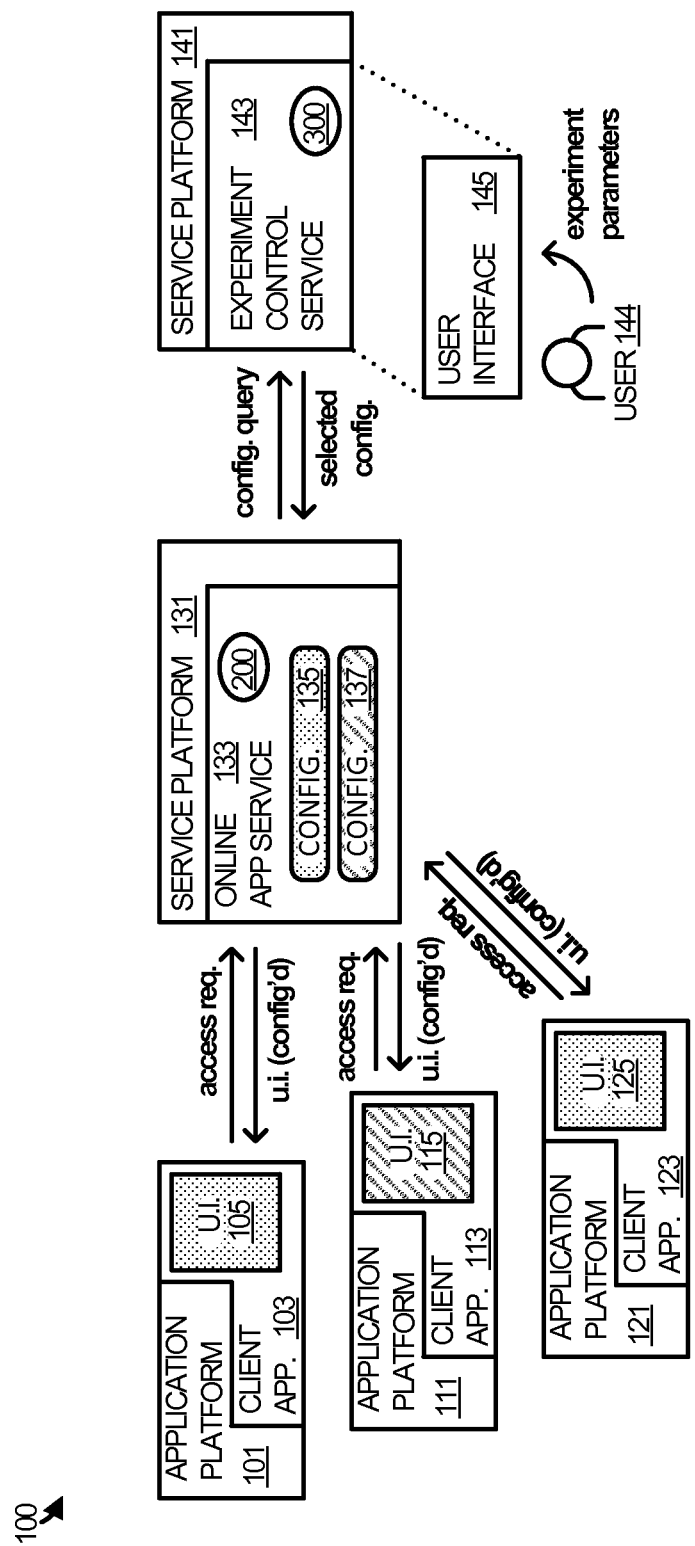
FIG. 1 illustrates an experimentation architecture and an associated operational scenario in an implementation.

Implementations disclosed herein include an experiment control system that enables runtime experimentation with respect to user interface configurations. In an implementation, an online application service is deployed in a deployment environment and provides end users with access to the service by way of client applications that operate locally with respect to the end users. The client applications may be, for example web browser applications or other types of client applications capable of communicating with an online application service and rendering a user interface to the online application service.

The client applications may communicate access requests to the online application service requesting access on behalf of the end users. To facilitate experimentation with a variety of user interface configurations, the online application service responsively communicates with an experiment control service to identify an experimental configuration to use for each instance of the service being requests by the client applications. The experiment control service replies with an experimental configuration in accordance with which the online application service presents the user interface to the end users via the client applications.

In some scenarios, the online application service queries the experiment control service to identify the experiment configuration on a per-request basis for each of the access requests communicated by the client applications. In other words, for each individual access attempt by a client application the online application service may make an individual query to the experiment control service. However, it may also be the case that the online application service queries the experiment control service periodically for experiment parameters or general configuration guidelines. The online application service may then follow the parameters or guidelines to determine which experimental configuration of various experimental configurations to serve to an end user.

The various experimental configurations that the experiment control system may choose from may include at least a default configuration and an alternate configuration. The experimental configuration that is selected could be the default configuration or the alternate configuration. The default configuration in some examples may be a configuration used for a majority of users while the alternate configuration may be different than the default configuration and used for a lesser share of the users. The online application service may in some scenarios be deployed to a deployment environment after having been compiled, integrated, or otherwise built in a build environment with at least the default configuration and the alternate configuration included therein. In other scenarios the default configuration may be included at build-time but the alternate configuration may be added later.

The experiment control service may be capable of interrogating the online application service in the deployment environment to identify undiscovered configurations, or "dark" configurations. The online application service may then reply with at least one undiscovered configuration to add to the various experimental configurations from which the experiment control service selects the experimental configuration.

The user interface to the online application service may include various characteristics expressed visually in each of various renderings of the user interface produced by the client applications requesting access on behalf of the end users. In some scenarios, each of the experimental configurations may include a different arrangement of the characteristics. The characteristics expressed visually in each of the renderings of the user interface may differ by at least one characteristic for each of the experimental configurations relative to others of the experimental configurations.

Examples of the characteristics include, but are not limited to the color scheme of the user interface, the color, font, font size, order, and position of information in the user interface, and other characteristics visually ascertainable by a user. Other ways in which the experimental configurations may differ from each other include the features exposed in the user interface, the positioning of the features relative to each other, and the layout of menus, windows, and other graphical objects. While the aforementioned characteristics related to user interface, other aspects of a service may also be experimented with, such as the algorithms employed by a service, storage schemas, and the like.

The online application service may be a stand-alone service. However, in some implementations the online application service may be one of a variety of online application services deployed in different deployment environments but that share in common a gateway user interface. The gateway to the online application services may provide a portal or starting point through which each of the services may be accessed. In some implementations, the user interface provides a user interface to settings features for the online application services. Examples of the settings features include, but are not limited to, a personalization feature, a software management feature for managing software installations, a password feature, a contact feature, and language preferences.

The experimental services may select an experimental configuration for a given end user based on a variety of criteria, including a status of a configuration experiment at a time of the request. The status may represent a progress made towards an allocation target that defines how many or in accordance with what ratio to select one configuration or another within the context of an experiment. For instance, an experiment may be underway to test the merits of one configuration relative to another by assigning one configuration to two-thirds of users and the other configuration to one-third of users. The status of the experiment may thus include the progress made towards assigning the configurations in view of this ratio. An evaluation of the relative performance of each of the configurations can be made by monitoring user behavior, such as how often they click, touch, or otherwise interact with a given feature information presented in the user interface.

The allocation target may be changed at run-time by virtue of the experiment control service. In an example, an experiment may begin with an initial allocation ratio but, in mid-experiment—may be changed to a different allocation ratio. A developer or manager of an experiment may desire to do so in order to increase or decrease the exposure of a given configuration to end-users. Such run-time changes may be made without having to commission a new build of an online service. Rather, the change can be made dynamically and at run-time, substantially increasing the speed with which experimentation can be performed with respect to user interface configurations.

Figure 3:
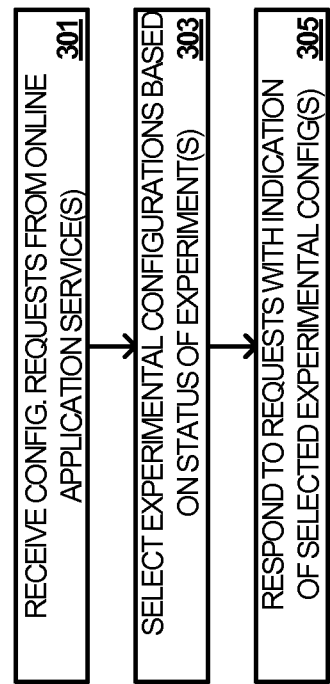
FIG. 3 illustrates an experimentation process in an implementation.
Figure 2:
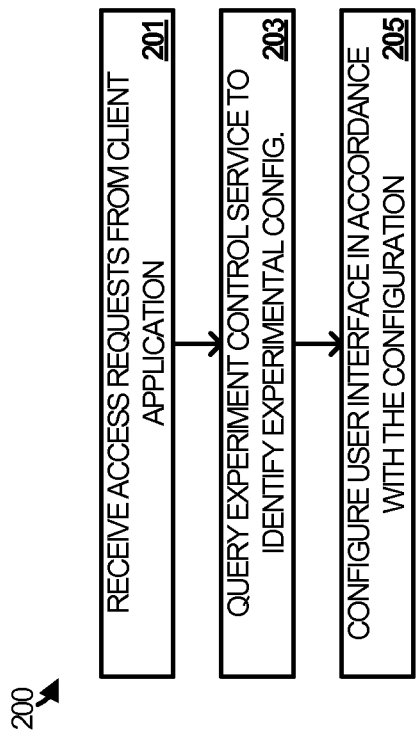
FIG. 2 illustrates an experimentation process in an implementation.
Figure 4:
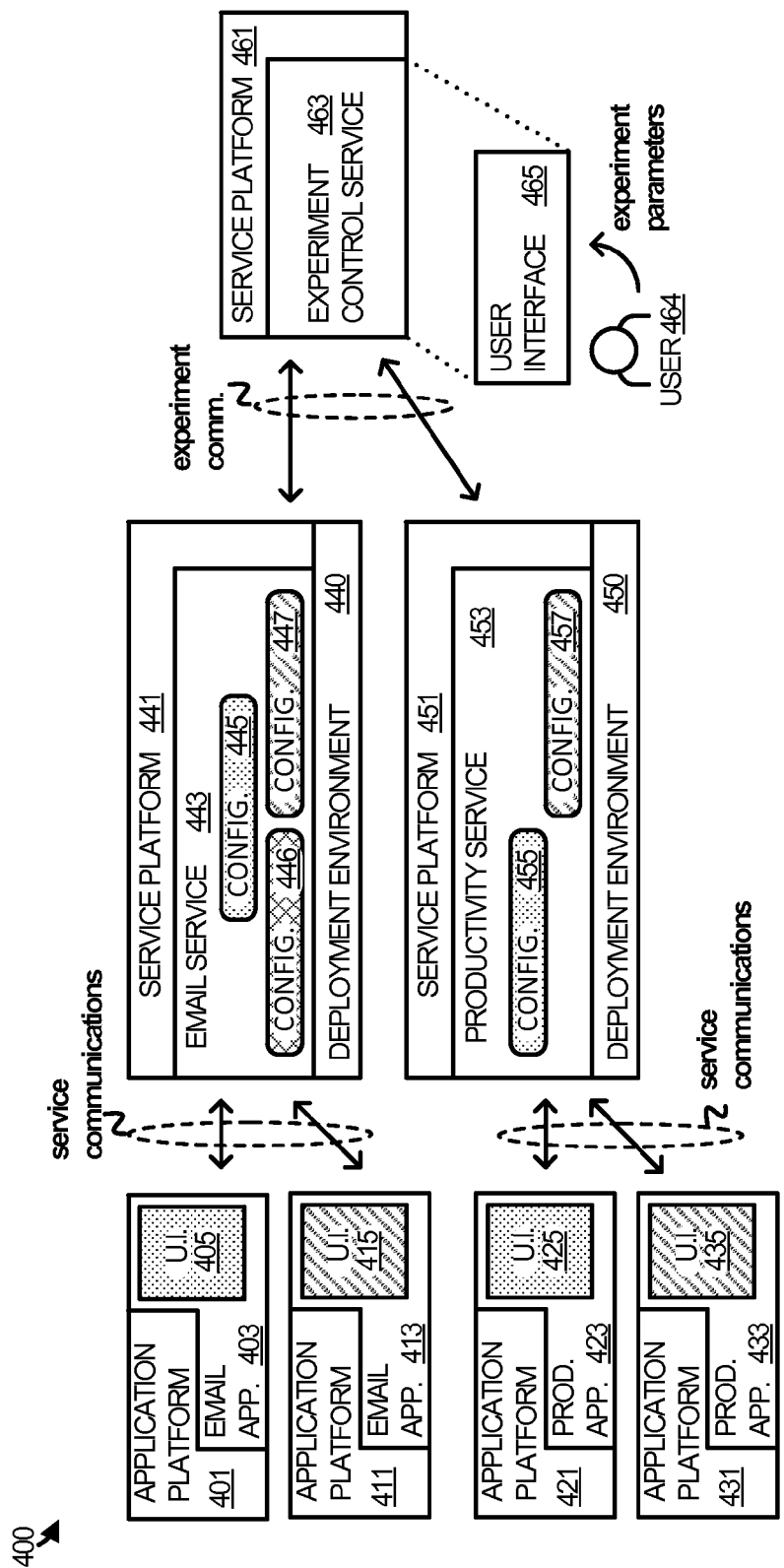
FIG. 4 illustrates an experimentation architecture and an associated operational scenario in an implementation.
Figure 5:
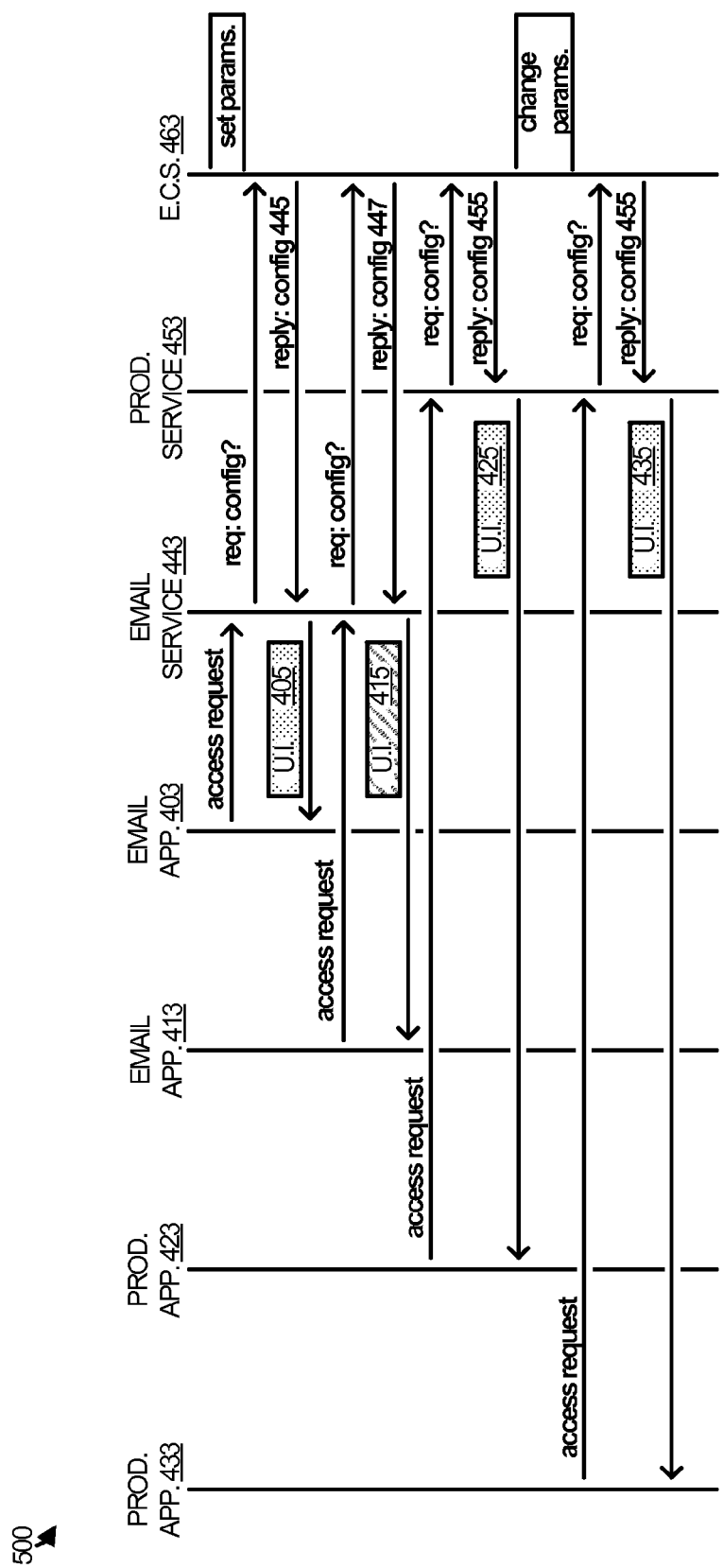
FIG. 5 illustrates an operational sequence in an implementation.
Figure 6:
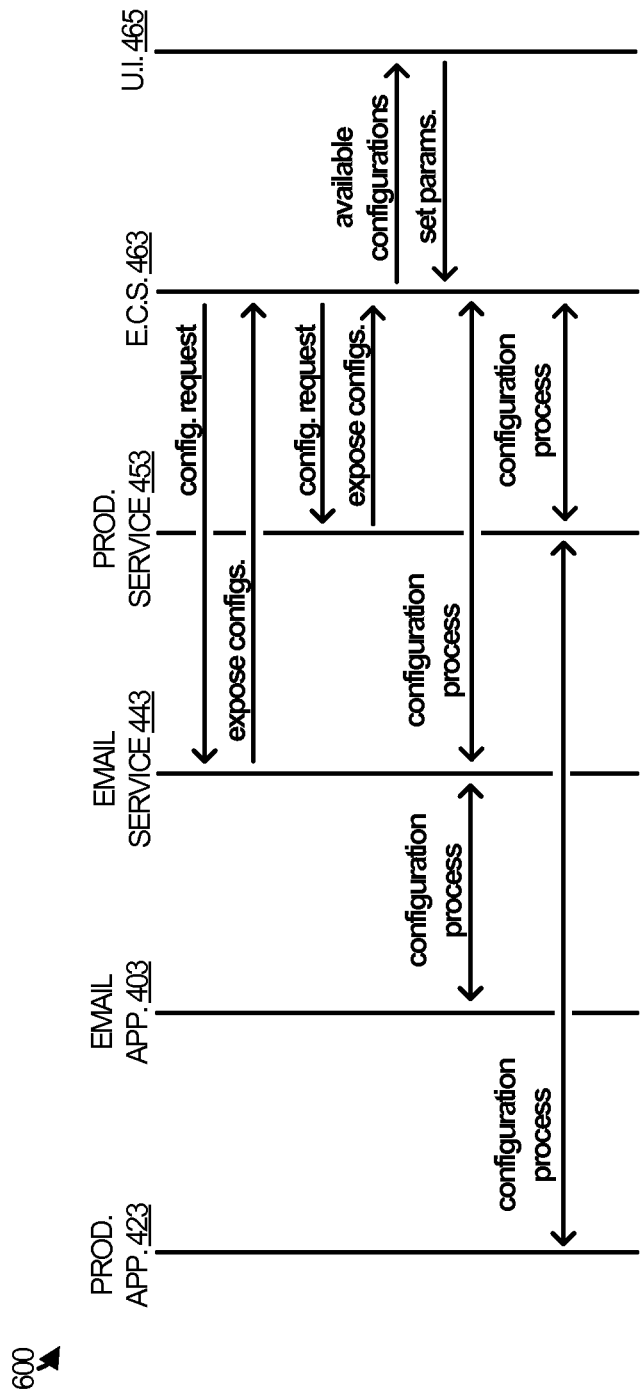
FIG. 6 illustrates an operational sequence in an implementation.
Figure 7:
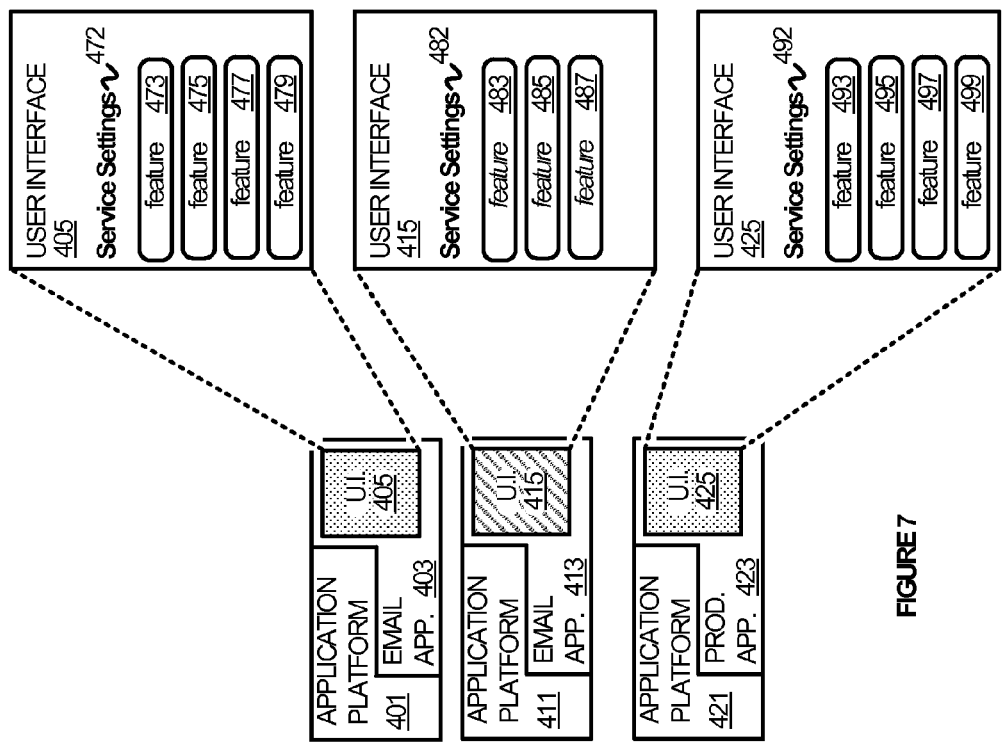
FIG. 7 illustrates an experimentation scenario in an implementation.
Figure 8:
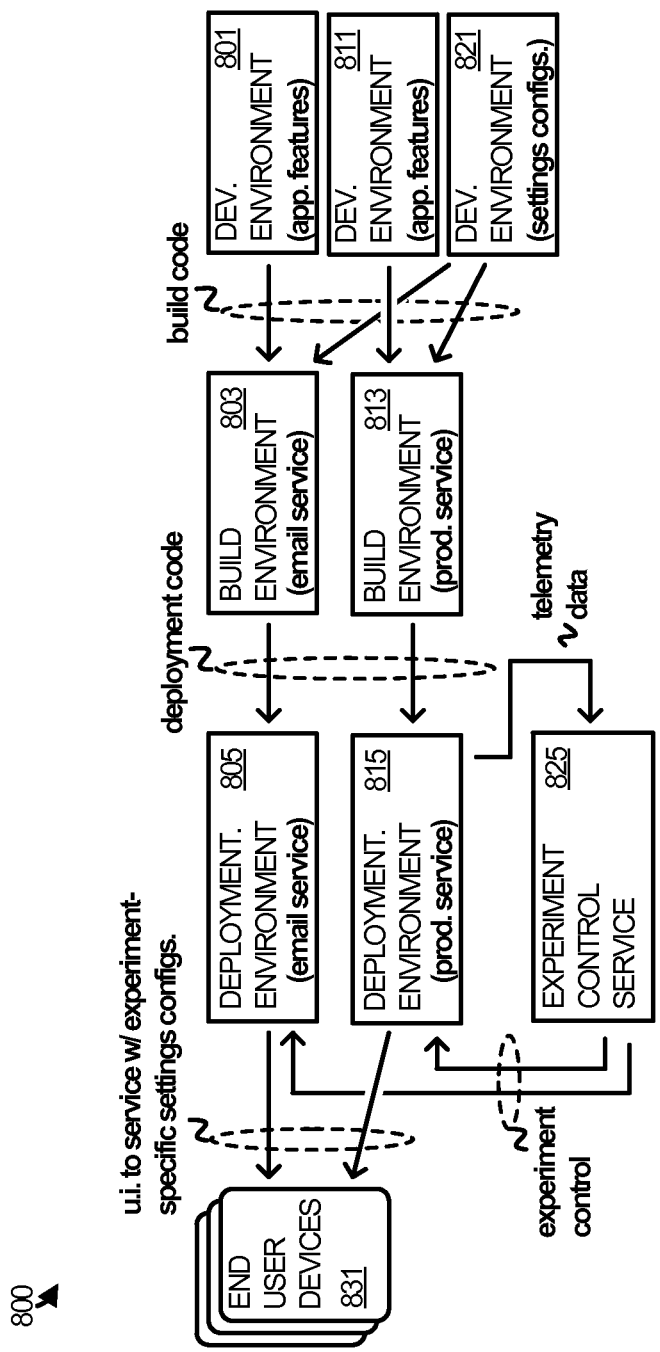
FIG. 8 illustrates an experimentation architecture in an implementation.
Figure 9:
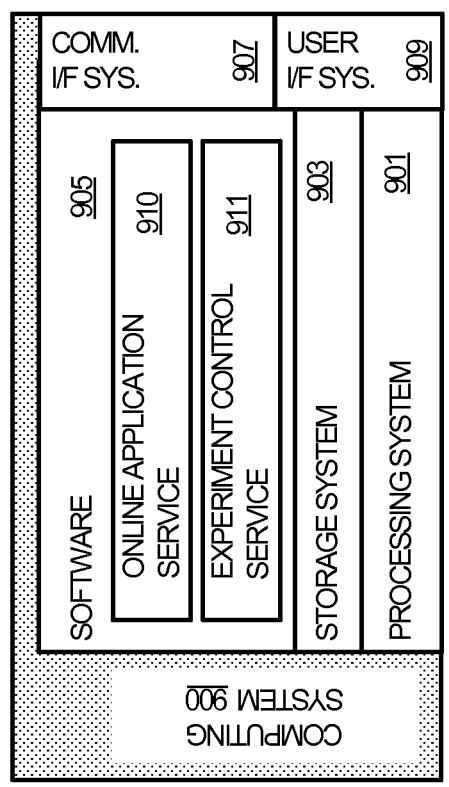
FIG. 9 illustrates a computing system in an implementation.

Referring now to the drawings, FIG. 1 illustrates an experimentation architecture in which an online application service communicates with client applications and an experiment control service. FIG. 2 illustrates an experimentation process employed by the online application service while FIG. 3 illustrates an experimentation process employed by the experiment control service. FIG. 4 illustrates an experimentation architecture and operational scenario that includes an email service and a productivity service. FIGS. 5-6 illustrate exemplary operational sequences and FIG. 7 illustrates a user interface and various experimental configurations. FIG. 8 illustrates another experimentation architecture in an implementation. FIG. 9 illustrates a computing system representative of the various application platforms and service platforms discussed herein.

Turning now to FIG. 1, experimentation architecture 100 includes application platform 101, application platform 111, and application platform 121, on which client application 103, client application 113, and client application 123 run respectively. Client application 103, client application 113, and client application 123 render user interface 105, user interface 115, and user interface 125 respectively, which are user interfaces to online application service 133. Online application service 133 runs on service platform 131 and communicates with experiment control service 143, running on service platform 141. Experiment control service 143 includes a user interface 145 via which personnel, such as user 144, may interact with experiment control service 143.

In operation, client applications 103, 113, and 123 communicate access requests to online application service 133 on behalf of various end users (not shown). The access attempts are, for example, requests for a login page, login credentials submitted through a login page or portal, a request for a particular web page that may be considered a portal to online application service 133, or some other type of access requests for a user interface to online application service 133.

In the context of conducting an experiment associated with multiple experimental configurations for a user interface to online application service 133, represented by configuration 135 and configuration 137, online application service 133 communicates a configuration query to experiment control service 143. In some instances, individual queries may be made in response to each individual access request. In other instances, a configuration query may pertain to multiple access requests or may be made periodically and the response applied with respect to multiple access requests.

Experiment control service 143 replies to the configuration query or queries with a selected configuration. The configuration may be selected from multiple experiment configurations, such as configuration 135 and configuration 137. Online application service 133 then configures user interfaces 105, 115, and 125 in accordance with the experiment configuration selected with respect to each corresponding access request communicated by client applications 103, 113, and 123 respectively. In this scenario, it is assumed for exemplary purposes that configuration 135 was selected for client applications 103 and 123, while configuration 137 was selected for client application 113. Accordingly, user interface 105 and user interface 125 share a fill pattern in common with configuration 135, while user interface 115 shares a fill pattern in common with configuration 137.

Experiment control service 143 may select one or the other of various experimental configurations based on experiment parameters provided by user 144 via user interface 145. User 144 may define a particular experiment in terms of which configurations are to be involved, the ratio of configuration deployment, and other factors. User 144 may also be able to change experiment parameters at run-time through user interface 145, which is discussed below with respect to other implementations.

FIG. 2 illustrates an experiment process 200 that may be employed by any online application service in the context of conducting configuration experiments, of which online application service 133 and email service 443, referred to with respect to FIG. 4, are two examples. In operation, various attempts to access the online application service occur and the online application service receives an access request related to an attempt (step 201). The access request may relate to an attempt to navigate to or request a web page associated with the online application service. The web page may be, for example, a launch page, a login page, or some other entry point to the online application service.

In response to the access request, the online application service queries an experiment control service to determine with which experimental configuration to configure a user interface (step 203). The query may be an explicit query associated with the access request. However, the online application service may continuously or periodically poll the experiment control service to ascertain which experimental configuration (from a set of experimental configurations) to serve up during any given period of time. In some implementations, the online application service is in possession of the experimental configurations, but in other cases the online application service also queries for the actual configuration information associated with an experimental configuration once it has been identified by the experiment control service.

The experiment control service replies with an indication of which experimental configuration to use and, as mentioned, may also in some scenarios reply with the actual configuration information for the experimental configuration. The online application service then configures the user interface in accordance with the experimental configuration and communicates the user interface in its configured state to an end-user device for consumption by an end user (step 205).

FIG. 300 illustrates another experimentation process 300, but which may be employed by an experiment control service, of which experiment control service 143, experiment control service 463, and experiment control service 825 are three examples. In operation, an experiment control service receives configuration requests or queries from various online application services (step 301). For each request, the experiment control service selects an experimental configuration based on the status of an experiment associated with the request (step 303).

For example, experiment parameters for a particular experiment involving two experimental configurations may deem that each experiment configuration be used evenly. As such, the experiment control service would identify or select each experimental configuration for every other configuration request that is made. In other words, the experiment control service would alternate between configurations. In another example, experiment parameters may deem that one configuration be used one-third of the time and another configuration be used two-thirds of the time. Thus, the status of the experiment would relate to the progress made towards satisfying the proscribed ratio. In yet another example, experiment parameters may proscribe that a certain quantity of users be exposed to a certain configuration prior to exposing any users to any other configuration. A variety of other experiment parameters and different types of experiment status are possible and may be considered within the scope of the present disclosure.

The experiment control service responds to each configuration request with an indication of a selected experimental configuration (step 305). It may be appreciated that this occurs when an online application service makes discrete configuration queries for each access attempt that occurs. However, other times the application services may continuously or periodically poll the experiment control service. Under such circumstances, the experiment control service may provide guidelines in response, or even general experiment parameters, with which an online application service may make its own configuration selections. For example, the experiment control service may respond to polling by simply communicating a configuration or experiment ratio in accordance with which an online application is to configure user interfaces. The online application service would then configure user interfaces in accordance with the ratio for a duration specified by the experiment control service. A change in the ratio may then be effected by the experiment control service merely by communicating a new ratio to the online application service.

Referring back to FIG. 1, application platforms 101, 111, and 121 are representative of any physical or virtual computing systems, devices, or collections thereof capable of running client applications 103, 113, and 123 and supporting user interfaces 105, 115, and 125 respectively. Examples of application platforms 101, 111, and 121 include, but are not limited to, smart phones, laptop computers, tablet computers, desktop computers, hybrid computers, gaming machines, smart televisions and virtual machines, as well as any variation or combination thereof.

Client applications 103, 113, and 123 are representative of any software application, module, component, or collection thereof, capable of communicating with online application service 133 and rendering user interfaces 105, 115, and 125. Examples of client applications 103, 113, and 123 include, but are not limited to, browser applications, email applications, calendar applications, real-time communication applications, blogging and micro-blogging applications, social networking applications, e-commerce applications, and gaming applications, as well as any other type of application. Client applications 103, 113, and 123 may be locally installed and executed applications, streamed applications, mobile applications, or any combination or variation thereof. In some implementations, client applications 103, 113, and 123 may be browser-based applications that execute in the context of a browser application. Client applications 103, 113, and 123 may be implemented as stand-alone applications or may be distributed across multiple applications.

Service platform 131 is representative of any physical or virtual computing system, device, or collection thereof capable of hosting all or a portion of online application service 133. Examples of service platform 131 include, but are not limited to, server computers, web servers, application servers, rack servers, blade servers, virtual machine servers, or tower servers, as well as any other type of computing system, of which computing system 900 illustrated in FIG. 9 is representative. In some scenarios, online application service 133 may be implemented in a data center, a virtual data center, or in some other suitable computing facility. Examples of online application service 133 include, but are not limited to, web services, email services, real-time communication services, blogging and micro-blogging services, social networking services, e-commerce services, and gaming applications, as well as any other type of service, combination of services, or variations thereof. Online application service 133 may sometimes be referred to as a cloud service, an online service, an Internet service, or the like.

Service platform 141 is representative of any physical or virtual computing system, device, or collection thereof capable of hosting all or portion of experiment control service 143. Examples of service platform 141 include, but are not limited to, server computers, web servers, application servers, rack servers, blade servers, virtual machine servers, or tower servers, as well as any other type of computing system, of which computing system 900 illustrated in FIG. 9 is representative.

FIG. 4 illustrates another experimentation architecture 400 and an associated operational scenario in an implementation. Experimentation architecture 400 includes application platform 401, application platform 411, application platform 421, and application platform 431. Application platform 401 and application platform 411 execute email application 403 and email application 413 respectively, which render user interface 405 and user interface 415 respectively. User interfaces 405 and 415 provide access to email service 443 hosted on service platform 441 within deployment environment 440. Email service 443 communicates with experiment control service 463, which is hosted in service platform 461. User 464 may interact with experiment control service 463 through user interface 465.

Experimentation architecture 400 also includes application platform 421 and application platform 431 on which productivity application 423 and productivity application 433 are hosted and run respectively. Productivity application 423 and productivity application 433 render user interface 425 and user interface 435, which are user interfaces to productivity service 453. Productivity service 453 is hosted on service platform 451 in deployment environment 450. Productivity service also communicates with experiment control service 463.

In operation, experiments may be conducted at run-time to test the effectiveness of various configurations for user interfaces to email service 443 and productivity service 453. Configuration 445, dark configuration 446, configuration 447, configuration 455, and configuration 457 represent such configurations for a user interface to the online application services represented by email service 443 and productivity service 453. Email application 403 and email application 413 exchange service communications with email service 443 in furtherance of email sessions, such as communications that allow for the sending and receiving of email. Productivity application 423 and productivity application 433 exchange service communications with productivity service 453 in furtherance of productivity sessions, such as word processing or other document editing sessions. The configuration of the user interfaces to the services may be selected in accordance with experiment parameters at any time before or during any of the aforementioned sessions.

Email service 443 exchanges experiment communications with experiment control service 463 in order to ascertain which configuration should be used for a given service session. Productivity service 453 also exchanges experiment communications with experiment control service 463 to ascertain a particular configuration for a given session. The user interface for a session is then configured and communicated by email service 443 or productivity service 453 to a client application capable of rendering the user interface.

In the operational scenario illustrated in FIG. 4, configuration 445 and configuration 455 share various characteristics in common, as is represented by the fill pattern shared by both elements, and may be considered individual instances of a user interface configuration. Configuration 447 and configuration 457 also share various characteristics in common, as represented by the fill pattern shared by both elements, and may also be considered instances of a configuration. Configuration 446 is representative of a dark configuration that may initially be unknown from the perspective of experiment control service 463.

Upon engaging with either of email application 403 and email application 413, email service 443 communicates with experiment control service 463 to determine which user interface configuration to apply. In this scenario, configuration 445 is applied to user interface 405 while configuration 447 is applied to user interface 415.

Productivity service 453 also communicates with experiment control service 463 to determine which configuration to apply to which instance of its user interface rendered by productivity application 423 and productivity application 433. User interface 425 is configured with configuration 455 while user interface 435 is configured with configuration 457 in this scenario.

FIG. 5 illustrates an operational sequence 500 to illustrate in implementation in which the parameters of an experiment may change and how such a change can be accommodated at run-time. In operation, experiment parameters are set in experiment control service 463. The experiment parameters are communicated by experiment control service 463 to both email service 443 and productivity service 453 on a per-request basis when client applications attempt to access the services. It may be appreciated that the parameters may be communicated in response to polling by email service 443 and productivity service 453, in response to specific queries made by either service responsive to access attempts, or for some other reason. The experiment parameters are initially set for the share of user interfaces to be configured with configuration 445 or configuration 455 to equal the share of user interfaces to be configured with configuration 447 or configuration 457. In other words, the experiment parameters relate to two different user interface configurations and apply across two different services—email service 443 and productivity service 453.

Email application 403 then communicates an access request to obtain access to email service 443. In response to the email request, email service 443 queries experiment control service 463 for an experimental configuration, which replies with an indication that configuration 445 should be used. Email service 443 configures user interface 405 in accordance with the experiment parameters provided by experiment control service 463 and user interface 405 is configured with configuration 445 as indicated by its fill pattern in FIG. 5. Email application 413 also communicates an access request to email service 443 requesting access to the service on behalf of a user, in response to which email service 443 again queries experiment control service 463. Experiment control service 463 replies with an indication that configuration 447 is to be used to configure user interface 415. Accordingly, email service 443 configures user interface 415 based on configuration 447 as indicated by the fill pattern in user interface 415.

Next, productivity application 423 attempts to access productivity service 453. Productivity service 453 queries experiment control service 463 for the appropriate configuration, which is indicated in reply as configuration 455. Thus, productivity service 453 provides user interface 425 to productivity application 433 with it configured based on configuration 455 as indicated by its fill pattern.

At this time the experiment parameters are changed, possibly by user 464 via user interface 465 to experiment control service 463. Whereas the parameters initially called for an even configuration ratio, the new parameters proscribe that a quarter of all user interfaces be configured based on configuration 447 or configuration 457. The new parameters are used by experiment control service 463 when replying to configuration queries by email service 443 and productivity service 453. Thus, when productivity application 433 attempts to access productivity service 453, productivity service 453 queries experiment control service 463 for a configuration and experiment control service 463 responds with an indication of configuration 455. User interface 435 is then configured based on configuration 455 as indicated by its fill pattern. This configuration is in accordance with the new parameters that proscribe that three-quarters of the user interfaces be configured based on configuration 445 or configuration 455. Had the experiment parameters not changed, configuration 457 would have been used to configure user interface 435.

FIG. 6 illustrates another operational sequence 600 to demonstrate that various configurations deployed in email service 443 and productivity service 453 may be discovered by experiment control service 463 at run-time and presented to personnel via user interface 465. In operation, experiment control service 463 interrogates email service 443 to ascertain which user interface configurations where deployed in email service 443. Email service 443 exposes its various configurations to experiment control service 463, which in the context of FIG. 4 includes a dark configuration 446 that had previously been undiscovered by experiment control service 463.

Experiment control service 463 also communicates with productivity service 453 to request that it expose its available configurations. Productivity service 453 replies with its available configurations, which in this scenario include configuration 455 and configuration 457.

Experiment control service 463 can then present all of the user interface configurations deployed and available in email service 443 and productivity service 453 to a user, such as user 464, through user interface 465. User 464 may create or modify run-time experiments through menus or other interface tools that may be presented in user interface 465. The tools may present a list or other arrangement of available user interface configurations, from which user 464 may make selections, set configuration ratios, and otherwise adjust or interact with the parameters for a given experiment. New experiments can be created at run-time, previously established experiments may be changed at run-time, and other tools may be available through user interface 465 to enhance the ability of personnel to run and evaluate experimental configurations.

FIG. 7 illustrates an experimentation scenario 700 to demonstrate various user interface configurations that may be the basis of a configuration experiment. In experimentation scenario 700, user interface 405 has been configured based on configuration 445, user interface 415 has been configured based on configuration 447, and user interface 425 has been configured based on configuration 457. It may be appreciated in this experimentation scenario 700 that user interface 405, 415, and 425 are instances of a gateway user interface to a general service that includes both email service 443 and productivity service 453. As user interface 405 and user interface 425 are both configured based on configuration 445, they do not differ, while user interface 415 does differ relative to the other user interfaces.

In particular, user interface 405 in this implementation includes a service settings menu 472 that exposes various features per configuration 445. The features that are exposed are represented by feature 473, feature 475, feature 477, and feature 479. In addition, the appearance of the features is governed by configuration 445, such as the font style and font size of information surfaced in each feature. User interface 425 includes the same look and feel as user interface 405 and includes features 493, 495, 497, and 499 in service settings menu 492. The features exposed in user interface 425 may be instances of the same features exposed in user interface 405.

User interface 415 has been configured with a different experimental configuration relative to user interfaces 405 and 425. As such, the features exposed in user interface 415 differ and the look and feel of the features differ. Namely, user interface 415 includes, in service settings menu 482, feature 483, feature 485, and feature 487, which may be instances of the same features as features 473, 475, and 477 in user interface 405 and features 493, 495, and 497 in user interface 425. However, user interface 415 lacks a feature corresponding to either feature 479 or feature 499. In addition, the font style of each feature is italics, as opposed to the regular, non-italic font style used in user interfaces 405 and 425.

FIG. 8 illustrates another experimentation architecture 800 and an associated operational scenario in an implementation. Experimentation architecture 800 illustrates a manner in which different online application services that share at least one user interface in common may be developed, built, and deployed.

In particular, experimentation architecture 800 includes a development environment 801, a build environment 803, and a deployment environment 805 for an email service. Experimentation architecture 800 also includes a development environment 811, a build environment 813, and a deployment environment 815 for a productivity service. Development environment 821 and experiment control service 825 are also included in experimental architecture 800.

In operation, developers associated with the email service engage with development environment 801 to develop application features for the email service. Build code is produced that can be submitted to build environment 803 for compiling and integration with other pieces of code for the email service. Build environment 803 produces deployment code that can be loaded into deployment environment 805 and executed in order to provide users with access to the email service via end user devices 831.

Developers associated with the productivity service engage with development environment 811 to develop application features for the productivity service. Build code is produced that can be submitted to build environment 813 for compiling and integration with other pieces of code for the productivity service. Build environment 813 produces deployment code that can be loaded into deployment environment 815 and executed in support of providing the productivity services to end user devices 831.

Developers may also engage with development environment 821 to develop settings configurations for both the email service and the productivity service. Experimentation architecture 800 illustrates development environment 821 as being separate from development environment 801 and development environment 811, although it some scenarios it may be integrated with one or both of the development environments. Build code related to the settings configurations is produced in development environment 821 and submitted to both build environment 803 and build environment 813.

Build environment 803 processes the build code associated with the settings configurations to produce development code that can be loaded and installed in deployment environment 805. Build environment 813 processes the build code associated with the settings configurations to product development code that can be loaded and installed in deployment environment 815. Thus, both the email service and the productivity service include deployment code for a group of settings configurations developed in development environment 821. Optionally, the settings configurations may in some scenarios be provided in a deployable form directly from development environment 821 to deployment environments 805 and 815, bypassing build environment 803 and build environment 813.

At run-time, a user interface to settings for the email service may be presented or otherwise delivered by deployment environment 805 to at least some of end user devices 831. A user interface to settings for the productivity service may be presented or otherwise delivered by deployment environment 815 to at least some of end user devices 831. How the user interface is configured may be controlled by experiment control service 825 in furtherance of an experiment or experiments being conducted.

For example, as access attempts are made by at least some of end user devices 831 to access the email service, at least an instance of the email service running in deployment environment 805 communicates with experiment control service 825 to determine which settings configuration to user for a given email session. An instance of the productivity service also communicates with experiment control service 825 to determine which settings configuration to use for a given productivity session.

It may be appreciated from experimentation architecture 800 that experiment control service 825 is able to conduct configuration experiments with respect to settings configurations developed for both an email service and productivity service and deployed in their respective deployment environments 805 and 815. Code for the email service and productivity service need not be re-produced and submitted anew in order to conduct the experiments. Rather, the services running in their respective deployment environments may communicate with experiment control service 825 at run-time in order to ascertain which settings configuration of various settings configurations to use for a given session.

In fact, experiment control service 825 may collect telemetry data from deployment environment 815 and deployment environment 805. The telemetry data may inform the analysis or observation of the various experiments that can be run by experiment control service 825. The telemetry data may, for example, describe user behavior with respect to the different user interface configurations that are employed within the context of an experiment. In this manner, the personnel that interact with experiment control service 825 to design and implement experiments can received direct feedback through the same system, such that they can may operational decisions with enhanced speed and efficiency.

Referring back to FIG. 4, application platforms 401, 411, 421, and 431 are representative of any physical or virtual computing systems, devices, or collections thereof capable of running email applications 403 and 413 and productivity applications 423 and 433 and supporting user interfaces 405, 415, 425, and 435 respectively. Examples of application platforms 401, 411, 421, and 431 include, but are not limited to, smart phones, laptop computers, tablet computers, desktop computers, hybrid computers, gaming machines, smart televisions and virtual machines, as well as any variation or combination thereof.

Email applications 403 and 413 are representative of any software application, module, component, or collection thereof, capable of communicating with email service 443 to facilitate email-related operations, including the rendering of user interfaces 405 and 415 respectively. Email applications 403 and 413 may be browser-based applications that execute in the context of a web browser. In other implementations they may be locally installed and executed applications, streamed applications, mobile applications, or any combination or variation thereof. Email applications 403 and 413 may be implemented as stand-alone applications or may be distributed across multiple applications.

Productivity applications 423 and 433 are representative of any software application, module, component, or collection thereof, capable of communicating with productivity service 453 to facilitate productivity-related operations, including the rendering of user interfaces 425 and 425 respectively. Examples include word processing applications, spreadsheet applications, presentation applications, and collaboration applications, to name just a few. Productivity applications 423 and 433 may be browser-based applications that execute in the context of a web browser. In other implementations they may be locally installed and executed applications, streamed applications, mobile applications, or any combination or variation thereof. Productivity applications 423 and 423 may be implemented as stand-alone applications or may be distributed across multiple applications.

While experimentation architecture 400 includes email applications and productivity applications, it may be appreciated that other types of applications may be supported and considered within the scope of the disclosure, in addition to or in place of the applications discussed herein. Experimentation architecture 400 and its associated operations could support other personal information management applications and services in addition to email, blogging applications and services, e-commerce applications and services, and media consumption applications and services, for example.

Service platform 441 is representative of any physical or virtual computing system, device, or collection thereof capable of hosting all or a portion of email service 443 and deployment environment 440. Examples of service platform 441 include, but are not limited to, server computers, web servers, application servers, rack servers, blade servers, virtual machine servers, or tower servers, as well as any other type of computing system, of which computing system 900 illustrated in FIG. 9 is representative. Service platform 441 may be implemented in a data center, a virtual data center, or in some other suitable computing facility.

Service platform 451 is representative of any physical or virtual computing system, device, or collection thereof capable of hosting all or a portion of productivity service 453 and deployment environment 450. Examples of service platform 451 include, but are not limited to, server computers, web servers, application servers, rack servers, blade servers, virtual machine servers, or tower servers, as well as any other type of computing system, of which computing system 900 illustrated in FIG. 9 is representative. Service platform 451 may be implemented in a data center, a virtual data center, or in some other suitable computing facility.

Service platform 461 is representative of any physical or virtual computing system, device, or collection thereof capable of hosting all or portion of experiment control service 463. Examples of service platform 461 include, but are not limited to, server computers, web servers, application servers, rack servers, blade servers, virtual machine servers, or tower servers, as well as any other type of computing system, of which computing system 900 illustrated in FIG. 9 is representative.

FIG. 9 illustrates a computing system 900 that is representative of any apparatus, system, or collections thereof suitable for implementing an online application service 910, an experiment control service 911, or both. Online application service 910 is representative of online application service 133, email service 443, and productivity service 453, as well as any other type of online application service. Experiment control service 911 is representative of experiment control service 143 and experiment control service 143. Examples of computing system 900 include server computers, rack servers, web servers, cloud computing platforms, and data center equipment, as well as any other type of physical or virtual server machine, and any variation or combination thereof. In some implementations, a collection of multiple computing systems may be employed to implement all or portions of online application service 910 which may be hosted in one or more data centers, virtual data centers, or any other suitable computing facilities.

Computing system 900 may be implemented as a single apparatus, system, or device or may be implemented in a distributed manner as multiple apparatuses, systems, or devices. Computing system 900 includes, but is not limited to, processing system 901, storage system 903, software 905, communication interface system 907, and user interface system 909, which is optional. Processing system 901 is operatively coupled with storage system 903, communication interface system 907, and user interface system 909.

Processing system 901 loads and executes software 905 from storage system 903. When executed by processing system 901 to implement online application service 910, software 905 directs processing system 901 to operate as described herein for the various online application services discussed in the foregoing implementations. When executed by processing system 901 to implement experiment control service 911, software 905 directs processing system 901 to operate as described herein for the various experiment control services discussed in the foregoing implementations. Computing system 900 may optionally include additional devices, features, or functionality not discussed for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer readable storage media readable by processing system 901 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 901 or possibly other systems.

Software 905 may be implemented in program instructions and among other functions may, when executed by processing system 901, direct processing system 901 to operate as described herein with respect to the various operational scenarios, sequences, and processes. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 901.

In general, software 905 may, when loaded into processing system 901 and executed, transform a suitable apparatus, system, or device (of which computing system 900 is representative) overall from a general-purpose computing system into a special-purpose computing system customized to facilitate run-time experimentation with user interface configurations as described herein for each implementation. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1 as an example, through the operation of a computing system or systems of which computing system 900 is representative, transformations may be performed with respect to user interfaces 105, 115, and 125. As an example, client applications 103, 113, and 123 may attempt to access online application service 133. In response, online application service 133 configures user interfaces 105, 115, and 125 with one or the other of configurations 135 and 137, thereby changing the state of user interfaces 105, 115, and 125. In addition, user interfaces 105, 115, and 125 are communicated to client applications 103, 113, and 123 and presented on application platforms 101, 111, and 121 respectively, thereby changing their state. Referring to FIG. 5, experiment parameters may change, thereby changing the ratio of experimental configurations applied to user interfaces. Other examples of transformations are possible and may be considered within the scope of the present disclosure.

It should be understood that computing system 900 is generally intended to represent a computing system or systems on which software 905 may be deployed and executed in order to implement run-time experimentation with user interface configurations. However, computing system 900 may also be suitable as any computing system on which software 905 may be staged and from where software 905 may be distributed, transported, downloaded, or otherwise provided to yet another computing system for deployment and execution, or yet additional distribution.

Communication interface system 907 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 900 and any other computing system (not shown) may occur over a communication network or networks and in accordance with various communication protocols, combinations of protocols, or variations thereof. Examples of communication networks over which computing system 900 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof. In some implementations, information may be exchanged in accordance with any of a variety of email protocols, including without limitation POP (Post Office Protocol), IMAP (Internet Message Access Protocol), MAPI (Messaging Application Programming Interface), HTTP mail, or any other suitable email protocol.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 901 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces can be input via user interface system 909.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for facilitating a run-time experiment with user interface configurations that, when executed by a computing system, directs the computing system to at least:
   receive, from a plurality of client devices, a plurality of access requests associated with a plurality of client applications attempting to access an online application service in a deployment environment;
   communicate with an experiment control service to identify experiment parameters for determining in accordance with which experimental configuration of a plurality of experimental configurations to present a user interface to the online application service for each of the plurality of client applications, wherein the experimental parameters comprise an allocation target ratio associated with each of the plurality of experimental configurations; and
   enhance the speed of the run-time experiment by dynamically configuring the user interface at run-time at least partly in accordance with the experimental configuration determined for each of the plurality of client applications based at least in part on the allocation target ratio associated with each of the plurality of experimental configurations.

2. The one or more computer readable storage media of claim 1 wherein the user interface comprises a plurality of characteristics expressed visually in each of a plurality of renderings of the user interface produced by the plurality of client applications and wherein each of the plurality of experimental configurations comprises a different arrangement of the plurality of characteristics.

3. The one or more computer readable storage media of claim 2 wherein the plurality of characteristics expressed visually in each of the plurality of renderings of the user interface differ by at least one characteristic of the plurality of characteristics for each of the plurality of experimental configurations relative to others of the plurality of experimental configurations.

4. The one or more computer readable storage media of claim 3 wherein the online application service comprises one of a plurality of online application services deployed in different deployment environments and wherein the user interface to the online application service comprises a gateway user interface to each of the plurality of online application services.

5. The one or more computer readable storage media of claim 4 wherein the plurality of online application services comprises an email service, a word processing service, and a cloud storage service, and wherein the user interface comprises service features and wherein the plurality of characteristics comprises an appearance of the service features.

6. The one or more computer readable storage media of claim 1 wherein the program instructions further direct the computing system to query the experiment control service for the experiment parameters periodically.

7. The one or more computer readable storage media of claim 6 wherein the plurality of experimental configurations comprises a default configuration and an alternate configuration available in the deployment environment prior to the plurality of access requests.

8. The one or more computer readable storage media of claim 7 wherein the program instructions further direct the computing system to, in response to a discovery request communicated by the experiment control service to identify undiscovered configurations, reply with at least one undiscovered configuration to add to the plurality of experimental configurations from which the experiment control service selects the experimental configuration.

9. A method of operating an online application service in a deployment environment to facilitate a run-time experiment with user interface configurations comprising:
   in the online application service, receiving, from a plurality of client devices, a plurality of access requests associated with a plurality of client applications attempting to access the online application service;
   in the online application service, communicating with an experiment control service to identify experiment parameters for determining in accordance with which experimental configuration of a plurality of experimental configurations to present a user interface to the online application service for each of the plurality of client applications, wherein the experimental parameters comprise an allocation target ratio associated with each of the plurality of experimental configurations; and in the online application service, enhancing the speed of the run-time experiment by dynamically configuring at run-time the user interface at least partly in accordance with the experimental configuration determined for each of the plurality of client applications based at least in part on the allocation target ratio associated with each of the plurality of experimental configurations.

10. The method of claim 9 further comprising the online application service querying the experiment control service for the experiment parameters periodically.

11. The method of claim 10 wherein the plurality of experimental configurations comprises a default configuration and an alternate configuration and wherein the method further comprises deploying the online application service to the deployment environment from a build environment with at least the default configuration and the alternate configuration included therein.

12. The method of claim 11 further comprising receiving a discovery request communicated by the experiment control service to identify undiscovered configurations and responsively replying with at least one undiscovered configuration to add to the plurality of experimental configurations from which the experiment control service selects the experimental configuration.

13. The method of claim 9 wherein the user interface comprises a plurality of characteristics expressed visually in each of a plurality of renderings of the user interface produced by the plurality of client applications and wherein each of the plurality of experimental configurations comprises a different arrangement of the plurality of characteristics.

14. The method of claim 13 wherein the plurality of characteristics expressed visually in each of the plurality of renderings of the user interface differ by at least one characteristic of the plurality of characteristics for each of the plurality of experimental configurations relative to others of the plurality of experimental configurations.

15. The method of claim 14 wherein the online application service comprises one of a plurality of online application services deployed in different deployment environments and wherein the user interface to the online application service comprises a gateway user interface to each of the plurality of online application services.

16. A method of operating an experiment control service to manage a user interface configuration experiment with respect to a plurality of online application services, the method comprising:

in the experiment control service, receiving, from a plurality of client devices, a plurality of requests communicated by the plurality of online application services for the experiment control service to identify in accordance with which of a plurality of experimental configurations to configure a user interface to the plurality of online application services rendered by a plurality of client applications;

in the experiment control service, and in response to each request of the plurality of requests, selecting an experimental configuration from the plurality of experimental configurations based at least in part on a status of the configuration experiment at a time of the request and an allocation target ratio associated with the experimental configuration;

in the experiment control service, enhancing the speed of the configuration experiment by dynamically modifying the allocation target ration associated with the experimental configuration based on a run-time change in the configuration experiment; and generating a plurality of responses to the plurality of requests indicative of at least the change in the experimental configuration.

17. The method of claim 16 wherein the configuration experiment comprises an evaluation of a relative performance of each of the plurality of configurations, wherein the plurality of experimental configurations comprises a default configuration and an alternate configuration.

18. The method of claim 17 wherein the configuration experiment comprises an allocation target that defines for how many of each of the plurality requests to select each of the plurality of experiment configurations.

19. The method of claim 18 wherein the method further comprises changing the allocation target at run-time and wherein each of the plurality of online application services comprises a different one than any other of the plurality of online application services.

20. The method of claim 16 wherein the plurality of online application services comprises an email service, a word processing service, and a cloud storage service, and wherein the user interface comprises a gateway user interface to the plurality of online application services.

* * * * *